United States Patent [19]

Nakaniwa et al.

[11] Patent Number: 5,031,450

[45] Date of Patent: Jul. 16, 1991

[54] APPARATUS FOR DETECTING INTAKE PRESSURE IN INTERNAL COMBUSTION ENGINE

[75] Inventors: Shinpei Nakaniwa; Junichi Furuya; Masuo Kashiwabara, all of Isesaki, Japan

[73] Assignee: Japan Electronic Control Systems Co., Ltd., Isesaki, Japan

[21] Appl. No.: 473,036

[22] Filed: Jan. 31, 1990

[30] Foreign Application Priority Data

Jan. 31, 1989 [JP] Japan ................................. 1-19883

[51] Int. Cl.$^5$ ............................................ G01M 15/00
[52] U.S. Cl. ..................................................... 73/115
[58] Field of Search ..................... 73/115, 117.2, 117.3; 364/558, 431.05; 123/412

[56] References Cited

U.S. PATENT DOCUMENTS

| 4,271,797 | 6/1981 | McCarbery | 123/412 |
| 4,388,825 | 6/1983 | deValpillieres | 73/115 |
| 4,475,381 | 10/1984 | Nakatomi et al. | 73/115 |
| 4,600,993 | 7/1986 | Pauwels et al. | 123/412 |

FOREIGN PATENT DOCUMENTS

58-150040  9/1983  Japan .

Primary Examiner—Robert Raevis
Attorney, Agent, or Firm—Foley & Lardner

[57] ABSTRACT

A method for detecting an intake pressure in an internal combustion engine which comprises detecting the intake pressure in the engine and at least one engine driving condition, variably setting a sampling period of the intake pressure to a sampling period, according to the engine driving condition, which is substantially different from a pulsation period of the intake pressure, sampling processing the intake pressure according to the sampling period set to set the value obtained by the sampling processing as a final detected value of the intake pressure, whereby the reliable sampling of the intake pressure is performed even if the intake pressure is pulsated.

15 Claims, 4 Drawing Sheets

APPARATUS FOR DETECTING INTAKE PRESSURE IN INTERNAL COMBUSTION ENGINE

BACKGROUND OF THE INVENTION (1) Field of the Invention

The present invention relates to an apparatus for detecting the intake pressure in an internal combustion engine. More particularly, the present invention relates to a technique of improving the precision of detection of the intake pressure which is used for controlling the engine such as the quantity of a fuel to be supplied into the engine.

(2) Related Art of the Invention

There is known an apparatus for controlling the supply of a fuel in an internal combustion engine, which comprises an intake presure (e.g. sucked negative pressure) detecting sensor disposed in a suction system, wherein the quantity of the fuel supplied to the engine is set and controlled according to the intake pressure detected by said sensor and the revolution number of the engine (see Japanese Unexamined Patent Publication No. 58-150040).

Since the intake pressure is caused to pulsate under influences of suction and exhaust of the cylinder, consequently, a timing for sampling the intake pressure significantly affects the detected value of the intake pressure.

The sampling timing of the intake pressure has been conventionally decided at predetermined crank angle positions, ignition timing or time intervals.

In the case where the intake pressure is sampled at a certain crank angle position, since the phase of the pulsation of the intake pressure to the crank angle position is greatly changed according to the engine load or the engine revolution number, a peak value of the pulsation or a central value of the pulsation is sampled according to the driving state, and therefore, the detected value of the intake pressure can not be reliable.

Further, in the case where the intake pressure is sampled at an output of the ignition signal, since the crank angle position at which the intake pressure is sampled is changed according to the change of the ignition timing, even if the engine load or revolution number is constant and the pulsation phase of the intake pressure is constant with respect to the crank angle position, the intake pressure to be sampled is changed. Accordingly, even if the fuel supply is controlled and set so that desired air-fuel ratio control characteristics can be obtained under the intake pressure sampled at a certain ignition timing, if the ignition timing is changed, the intake pressure sampled is greatly changed to degrade the air-fuel ratio control characteristics, and even if the intake pressure is constant, if the ignition timing is changed, a difference or gap is produced in the air-fuel ratio.

Furthermore, in the case where there is adopted a structure in which the intake pressure detected by a sensor is sampled at certain short time intervals (for example, 5 milliseconds), even if the time of one period of the intake pulsation at a reference revolution rate of, for example, 6000 r.p.m. is made in agreement with the time of the above-mentioned sampling period so that sampling is effected at a certain position of the pulsation (for example, the position traversing the central value of the pulse width at 6000 r.p.m., if the revolution rate shifts slightly from the reference revolution rate, for example, to 6001 r.p.m., the sampling position at the pulsation deviates gradually, creating an incremental increase of a measured intake pressure pulsation period. Over a long period, a pulsation period may become as long as several seconds to scores of seconds may be generated and an air-fuel ratio of the intake mixture as well as the exhaust state is periodically worsened. As is seen from the foregoing description, in the case where the air-fuel ratio changes at a long period, even if the weighted average of the sampled intake pressure is taken, it is difficult to obviate the above-mentioned pulsation of the air-fuel ratio.

SUMMARY OF THE INVENTION

The present invention has been completed under the above-mentioned background, and it is an object of the present invention to provide an intake pressure-detecting apparatus in which, in carrying out the sampling processing of an intake pressure for controlling an engine, no difference or gap is formed in the sampled intake pressure.

A further object of the present invention is to provide an intake pressure-detecting apparatus in which generation of a long-period variation in the sampled values can be avoided.

To achieve the object, in accordance with the present invention, there is provided a method for detecting an intake pressure in an internal combustion engine which comprises detecting the intake pressure in the engine and at least one other engine driving condition, variably setting a sampling period of the intake pressure to a sampling period, according to the engine driving condition, which is substantially different from a pulsation period of the intake pressure, sampling and processing the intake pressure according to the sampling period set to set the value obtained by the sampling processing as a final detected value of the intake pressure.

Figure 1:
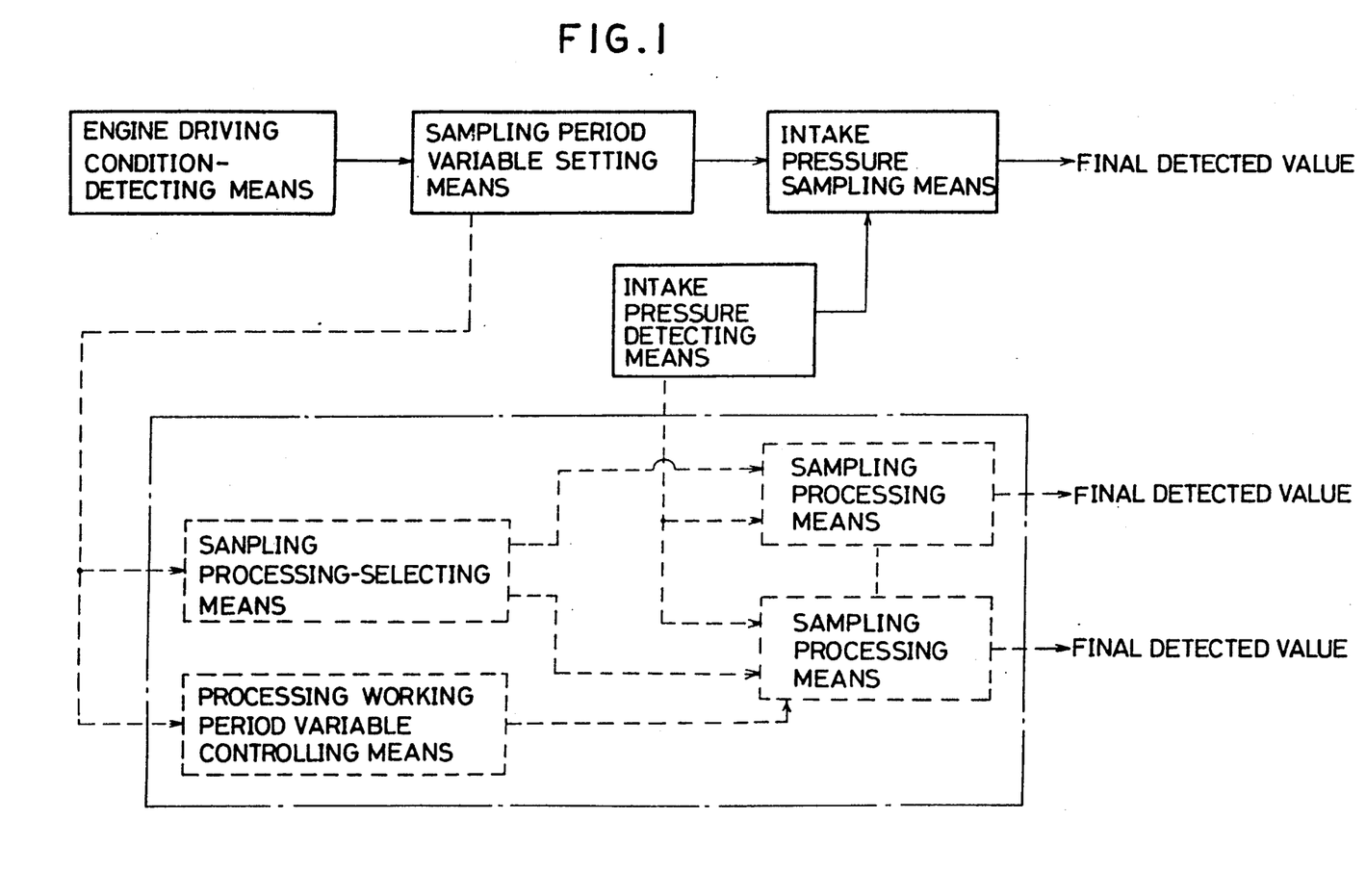
FIG. 1 is a block diagram illustrating the structure of the present invention.

Further, in accordance with the present invention, there is provided an apparatus for detecting the intake pressure in an internal combustion engine, which comprises, as shown in a dotted line in FIG. 1, intake pressure-detecting means disposed at an intake path of the engine to detect the intake pressure in the engine, engine driving condition-detecting means for detecting an engine driving condition, sampling period variable setting means for variably setting sampling period of the intake pressure to a sampling period which is substantially different from a pulsation period of the intake pressure according to the engine driving condition detected by the engine driving condition-detecting means, and intake pressure sampling means which is worked according the sampling period set by the sampling period variable setting means to effect sampling and processing of the intake pressure detected by the intake pressure-detecting means and set the value obtained by the sample processing as the final detected value of the intake pressure.

In accordance with the above-mentioned structure, the sampling period variable setting means sets variably the period of the sampling processing of the intake pressure to a sampling period, for example, by retrieving it from a map, which is substantially different from a pulsation period of the intake pressure, according to the engine driving condition detected by the engine driving condition-detecting means.

The intake pressure sampling means is operated according to the sampling period set in the above-mentioned manner to effect the sampling processing of the intake pressure detected by the intake pressure-detecting means, and the value obtained by this sampling processing is set as the final detected value of the intake pressure.

Consequently, according to the present invention, since the sampling and processing of the intake pressure is performed by variably setting the sampling period to the period different from the pulsation period of the intake pressure, according to the engine driving condition, especially the revolution rate of the engine, a long-period change of the sampled intake pressure caused by the alignment between the sampling period and the pulsation period of the intake pressure can be avoided. Accordingly, the engine control characteristics such as the air-fuel ratio control characteristics in the fuel supply control based on the sampled intake pressure can be improved.

The intake pressure sampling means may be constituted so that the intake pressure is sampled at every time interval, and the weighted average of the sampled value is calculated. Therefore, the pulsation of the pressure having no relation to the true quantity of air sucked in the engine can be smoothed, and no great difference is produced in the sampled intake pressure.

The period different from the intake pulsation period may be expressed in any period except the product of the intake pulsation period multiplied by n or the product of the intake pulsation period multiplied by 1/n, when n represents an integral number.

The sampling period of the intake pressure may be variably and continuously set to the period which is substantially different from the intake pulsation period, according the the engine driving condition.

Further, the sampling period of the intake pressure may be selectively changed to be set to the period which is substantially different from the pulsation period of the intake pressure.

Furthermore, in the above-mentioned apparatus, there may be adopted a structure in which, as shown by dot lines in FIG. 1, the intake pressure sampling means comprises a plurality of sampling and processing means which are operated at different periods to effect processing of the intake pressure detected by the intake pressure-detecting means and set the final detected value, and sampling and processing-selecting means for selecting only the sampling and processing means, which operated at the period corresponding to the set sampling period, among the plurality of the sampling processing means and causing only the selected sampling processing means to perform the sample processing of the intake pressure.

More specifically, instead of the above structure in which the working period of the intake pressure sampling means is not changed according to the sampling period, there can be adopted a structure in which a plurality of sampling and processing means operated at different periods are disposed, and the sampling processing means operated at the sampling period set variably according to the engine driving condition is selected and the intake pressure is sampled by this selected processing means.

Furthermore, the processing working period variable controlling means variably controls the working period of at least one of the plurality of the sampling and processing means according to the sampling period corresponding to the engine driving condition. If the working period of at least one of the plurality of the sampling processing means is variably controlled, the apparatus can easily cope with the case where it is necessary to change over many sampling periods according to the engine driving condition or the case where different sampling and processings should be performed according to the engine driving condition.

The revolution rate of the engine may be detected by the engine driving condition-detecting means as the engine driving condition for setting the sampling period, whereby the sampling and processing can be performed according to the phase of the pulsation of the intake pressure to the crank angle position, which changes according to the revolution rate.

The present invention will be understood from the following description of an embodiment illustrated in the accompanying drawings.

DESCRIPTION OF THE PREFERRED EMBODIMENT

Figure 2:
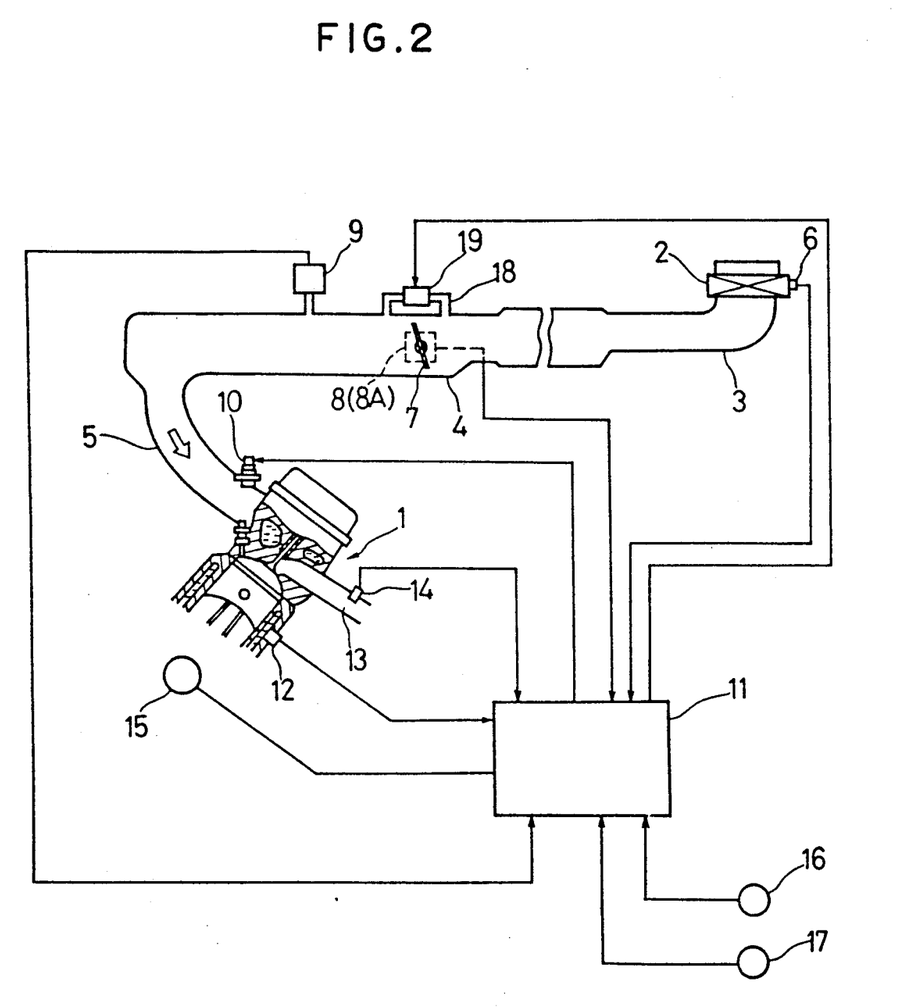
FIG. 2 is a system diagram illustrating one example of the present invention.

Referring to FIG. 2 showing the system structure of one example of the present invention, air is sucked into an internal combustion engine 1 through an air cleaner 2, a suction duct 3, a throttle chamber 4 and a suction manifold 5. An intake temperature sensor 6 for detecting the temperature TA (°C.) of the intake air is disposed in the air cleaner 2. A throttle valve 7 co-operating with an accelerator pedal (not shown) is arranged in the throttle chamber 4 to control the sucked air flow quantity Q. A throttle sensor 8 comprising an idle switch 8A which is turned on at a wholly closed position (idling position) of the throttle valve is attached to the throttle valve 7 together with a potentiometer for detecting the opening TVO of the throttle valve 7.

An intake pressure sensor 9 is arranged as the intake pressure-detecting means for detecting the intake pressure PB on the suction manifold 5 located downstream of the throttle valve 7, and an electromagnetic fuel injection valve 10 is arranged for each cylinder. The fuel injection valve 10 is driven and opened by a driving pulse signal emitted from a control unit 11 having a microcomputer installed therein synchronously with, for example, the ignition timing, and a fuel fed under pressure from a fuel pump (not shown) and maintained at a predetermined pressure by a pressure regulator is injected and supplied into the manifold 5. Namely, the quantity of the fuel supplied by the fuel injection valve 10 is controlled by the time of driving and opening the fuel injection valve 10.

Furthermore, a water temperature sensor 12 is arranged to detect the temperature Tw of cooling water in a cooling jacket of the engine, and an oxygen sensor 14 is disposed to detect the air-fuel ratio in a sucked air-fuel mixture by detecting the concentration of oxygen in the exhaust gas in an exhaust path 13.

The control unit 11 detects the engine revolution rate N by counting crank unit angle signals POS emitted synchronously with the revolution of the engine from the crank angle sensor 15 for a certain time or by measuring the period of crank reference angle signals REF emitted at every predetermined crank angle position (at every 180° in the case of the four-cylinder engine).

Still further, a speed sensor 16 for detecting a car speed and a neutral sensor 17 for detecting the neutral position are arranged on a transmission attached to the engine 1. Signals from these sensors are put into the control unit 11.

An electromagnetic idling controlling valve 19 is arranged in an auxiliary air path 18 bypassing the throttle valve 7 to control the idling speed through the quantity of auxiliary air.

The control unit 11 performs the sampling and processing of the intake pressure PB detected by the intake pressure sensor 9, and simultaneously, the control unit 11 computes the fuel injection quantity Ti (the pulse width of the injection pulse signal) based on the various detection signals and controls the driving and opening of the fuel injection valve 10 based based on the set fuel injection quantity Q. Moreover, at the idling operation detected by the idle switch 8A and neutral sensor 17, the control unit 11 performs the feedback control of the idling speed to the target idling speed by controlling the opening of the idling controlling valve 19.

Various computing processings performed by the control unit 11 for detecting and controlling the intake pressure PB will now be described with reference to routines shown in flow charts of FIGS. 3 through 5.

Figure 3:
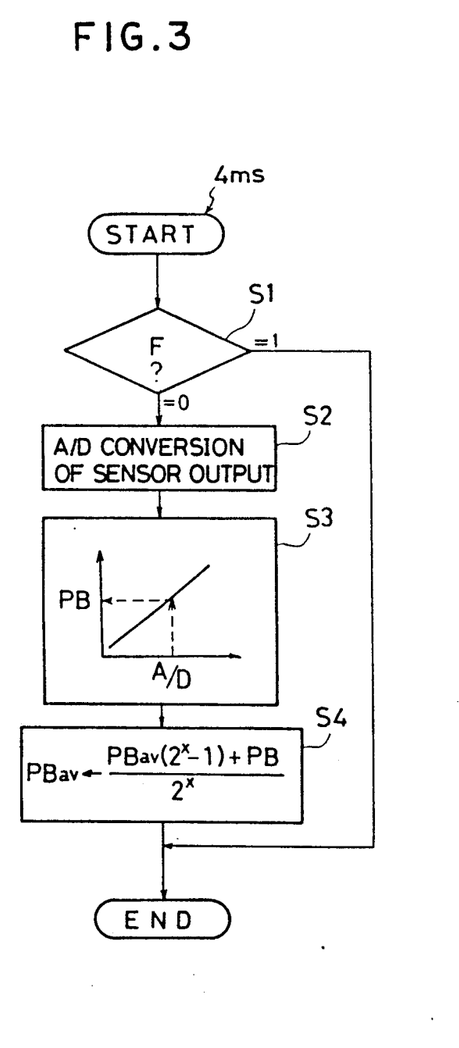
FIGS. 3 through 5 are flow charts showing the sampling processing of the intake pressure PB in the above example.
Figure 4:
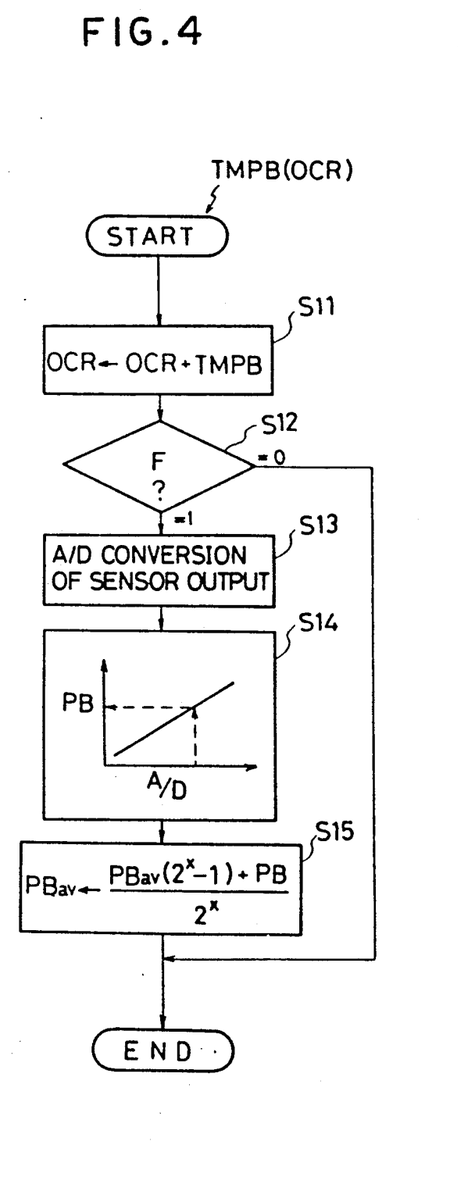
Figure 5:
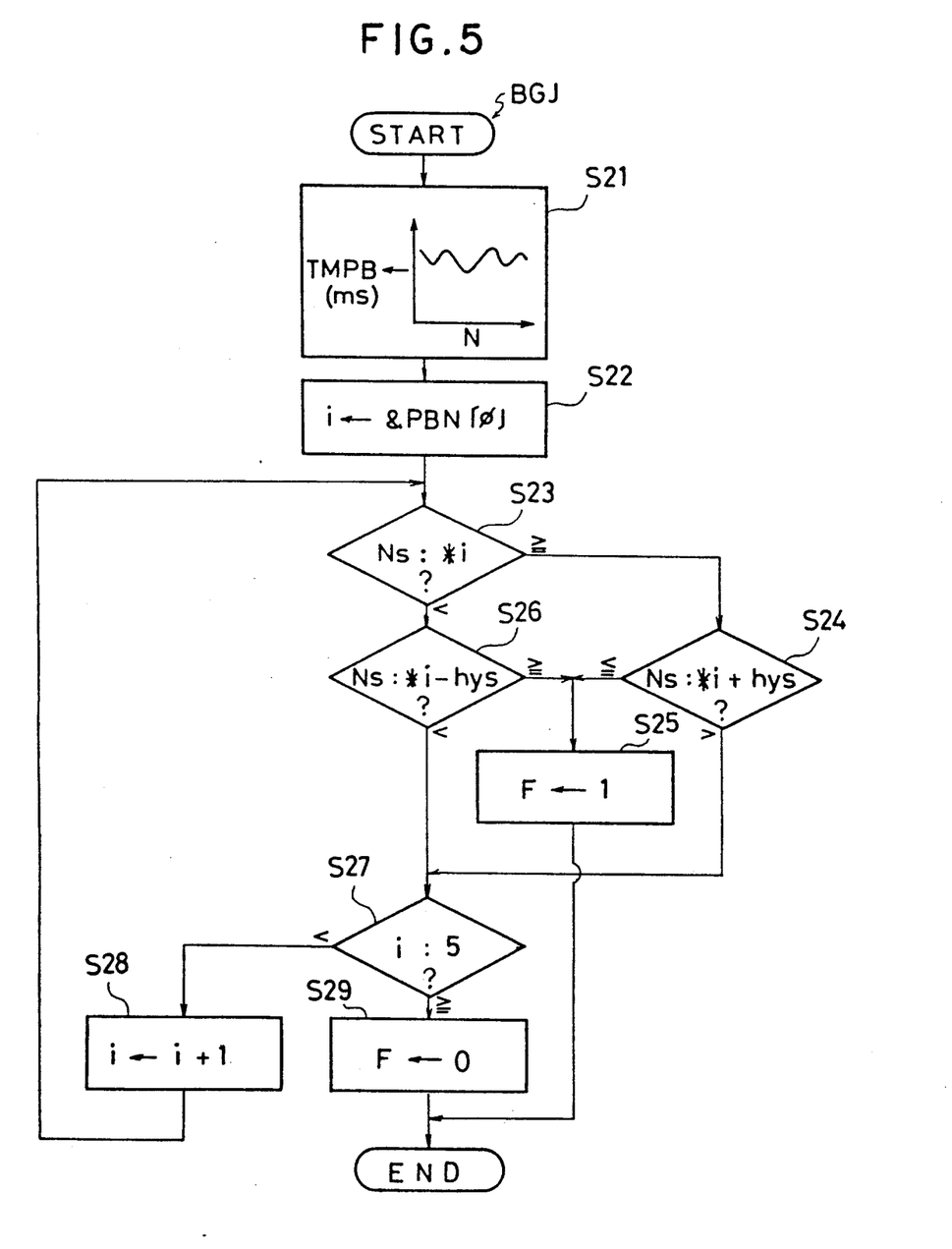

In the present example, the functions of the sampling period variable setting means, intake pressure sampling means, sampling and processing means, sampling and processing selecting means and processing working period variable controlling means are exerted in software behaviors as shown in the flow charts of FIG. 3 through 5. In the present example, the engine driving condition used to set the variable sampling period is the revolution rate N of the engine, and the crank angle sensor 15 corresponds to the engine driving condition-detecting means.

The routine shown in the flow chart of FIG. 3 shows a first sampling and processing routine and is conducted at a fixed period of 4 milliseconds. At step 1 (shown as S1 in the drawings; the same will apply to other steps), the state of flag F for changing over the routine of the sampling processing of the intake pressure PB detected by the intake pressure sensor 9 is discriminated. The discrimination of flag F is the sampling and processing-selecting means.

As described hereinafter, this flag F is set based on the stored data of the several engine revolution rates N detected concurrently with the timing of the sampling of the intake pressure P. In the case where the period of the pulsation of the intake pressure PB estimated from the engine revolution rate N is closed to the working period (4 milliseconds) of the present routine, the flag F is set at 1.

If the intake pressure PB is sampled according to the present routine in the state where 1 is set in the flag F, since the period of the pulsation of the intake pressure PB is close to the sampling period in the present routine, even if a value close to the central value of the pulsation can be sampled at a certain revolution rate N, if the revolution rate slightly deviates from this revolution rate N, the sampling position shifts gradually and the intake pressure PB sampled varies to become a long period (a period of several seconds to scores of seconds).

In this case, good smoothing of the sampled intake pressure cannot be attained by the weighted average computing, and if the fuel supply quantity is controlled by using this intake pressure PB, a long-period deflection of the air-fuel ratio is generated.

Accordingly, if it is judged at step 1 that 1 is set in the flag F, the present routine is terminated. If it is judged that the flag F is at 0, that is, in the case where the pulsation period of the intake pressure PB is substantially different from the sampling period in this routine, since no pulsation of a long period is generated even if the sampling is performed according to this routine, the sampling processing of the intake pressure PB is performed according to the present routine.

When it is judged at step 1 that the flag F is at 0, the routine goes into step 2.

At the step 2, a voltage signal emitted according to the intake pressure PB from the intake pressure sensor 9 is A/D-converted and put into the subsequent step 3. At the step 3, the intake pressure PB is determined based on the voltage value obtained by this A/D conversion.

At the subsequent step 4, the weighted average of the intake pressure PB obtained at the step 3 and the final detected value PBav at the precedent processing period is computed according to the following formula to smooth the sampled intake pressures PB and newly set the final detected value PBav:

$$PBav \leftarrow \frac{PBav\,(2^x - 1) + PB}{2^x}$$

The routine shown in the flow chart of FIG. 4 shows a rountine of a second sampling and processing means and is worked at every sampling period time TMPB set variably to a period different from the intake pulsation period according to the engine revolution rate N in the routine shown in the flow chart of FIG. 5, as described hereinafter.

At step 11, the timing of an interrupt operation performed by a free run counter is set. At this step, the presently set sampling period time TMPB is added to the present interrupt operation timing count value OCR to set a new interrupt operation count value OCR, and when the time corresponding to the sampling period time TMPB passes from the present interrupt operation timing, the value of the free run counter becomes the new OCR value, and the interrupt operation in this routine is given.

More specifically, when the value of the free run counter is in agreement with the interrupt operation value OCR, the routine of FIG. 4 is conducted. Every time the interrupt operation of the present routine is carried out, the sampling period time TMPB, which is the time remaining before the subsequent operation, is added, and after the passage of the sampling period time TMPB from the present interrupt operation timing, the subsequent interrupt operation is conducted.

At the subsequent step 12, the above-mentioned discrimination of the flag F is carried out. When the flag F is at 0, the sampling and processing of the intake pressure is carried out according to the routine shown in the flow chart of FIG. 3, but when the flag F is at 1 and an apprehensive long-period deflection of the sampled intake pressure PB is caused by the sampling processing of the intake pressure PB shown in the flow chart of FIG. 3, the sampling processing of the intake pressure PB is conducted according to the present routine of FIG. 4 where the computation is effected at a working period different from that shown in the flow chart of FIG. 3. Namely, at the working period different from (4 milliseconds × integer n) or 4 milliseconds/n.

Accordingly, when it is judged at the step 12 that the flag F is at 0, the present routine of FIG. 4 is terminated, bUT when it is judged that the flag F is at 1, the routine goes into step 13 and subsequent steps, and the sampling processing of the intake pressure PB is carried out.

At the step 13, the voltage signal emitted from the intake pressure sensor 9 according to the intake pressure PB is taken at each time period TMPB, and is A/D-converted and put into the routine. At the subsequent step 15, the intake pressure PB is determined based on the voltage value obtained by this A/D conversion.

At the subsequent step 15, the weighted average value of the intake pressure PB obtained at the step 14 and the precedent final detected value PBav is computed according to the following formula and the new final detected value PBav is set:

$$PBav \leftarrow \frac{PBav (2^x - 1) + PB}{2^x}$$

As is apparent from the foregoing description, the content of the sampling processing of the intake pressure PB in the flow chart of FIG. 3 (a first sampling processing means) is the same as that of the sampling processing of the intake pressure PB in the flow chart of FIG. 4 (a second sampling processing means), though they are different only in the sampling period time.

The sampling period in the flow chart of FIG. 3 is constant and the sampling period in the flow chart is variable, however the latter may be also be of a different, constant period.

Setting and control (processing working period variable controlling means) of the flag F and the sampling period time TMPB will now be described with reference to the routine shown in the flow chart of FIG. 5.

This routine is conducted as the background job (BGJ). At step 21, the sampling period TMPB is retrieved and determined from a present map based on the engine revolution rate N computed based on a detection signal from the crank angle sensor 15. The sampling period time TMPM retrieved here is the working period of the routine shown in the flow chart of FIG. 4. Accordingly, the routine shown in the flow charts of FIGS. 3 and 4 are conducted at different periods.

At the subsequent step 22, the six values PBM 0 to PBN 5 of the engine revolution rate N that were detected previously to the renewal and computation of the final detected value PBar of intake pressure PB are stored, and, the address (0) of the storage location PBN 0 is set at 1.

At the subsequent step 23, the data *1 of the engine revolution rate N stored at the address i set at step 22, that is, the data at the storage location PBN 0, is compared with the reference revolution number Ns. The reference engine revolution rate Ns referred to herein is the revolution rate N at which the pulsation period of the intake pressure PB is substantially in agreement with the working period (4 milliseconds) in the flow chart of FIG. 3.

If it is judged at the step 23 that the data *i of the revolution number N at the address i is smaller than or equal to the reference revolution number Ns, the routine goes into step 24, and at this step 24, the data obtained by adding the hysteresis portion hys to the data *i of the revolution number N at the address i is compared with the reference revolution number Ns. In case of $Ns \leq *i + hys$, it is judged that although the data *i of the revolution number N at the address i is smaller than the reference revolution number Ns, the difference is not larger than the hysteresis portion hys and the data *i is relatively close to the reference revolution number Ns.

If the stored revolution number N is smaller than and close to the reference revolution number Ns as mentioned above, the routine goes into step 25 from the above-mentioned step 24, and the flag F is set at 1 and the present routine is terminated.

If it is judged at the step 23 that the data *i of the revolution number N at the address i exceeds the reference revolution number Ns, the routine goes into step 26 and the data obtained by subtracting the hysteresis portion hys from the data *i is compared with the reference revolution number Ns. In case of $Ns \geq *i - hys$, it is judged that although the data *i of the revolution number N at the address i exceeds the reference revolution number Ns, the difference is not larger than the hysteresis portion hys and the data i is relatively close to the reference revolution number Ns.

Also, when the data *i is larger than and close to the reference revolution number Ns as described above, the routine goes into the step 25 and the flag F is set at 1, and the present routine is terminated.

Namely, if the data *i is larger or smaller than the reference revolution number Ns with the difference being smaller than the hysteresis portion hys, the data *i is regarded as being sufficiently close to the reference revolution number Ns, and the flag F is set at 1. If the flag F is set at 1 when the revolution number N is close to the reference revolution number Ns, the sampling processing of the intake pressure PB is performed according to the routine shown in the flow chart of FIG. 4, and therefore, the sampling processing is prevented from being conducted at a period substantially equal to the pulsation period of the intake pressure PB or at a period an integral number of times as long as the pulsation period or a period corresponding to one-nth of the pulsation period (n is an integer), whereby a long-period deflection of the sampled values can be avoided.

On the other hand, in the case where the data *i at the present address i is not close to the reference revolution number Ns, the routine goes into step 27 from the step 24 or 26, and the address i is compared with the maximum value 5. If the address i does not arrive at the maximum value 5, the routine goes into step 28 from the step 27, and the present address i is increased by one, and the routine goes into the step 23 again and the data *i of the revolution number N stored at the subsequent storage location is compared with the reference revolution number Ns. If it is judged at the step 27 that the address i is larger than the maximum value 5, the routine goes into step 29 and the flag F is set at zero.

More specifically, six data, including the newest one, of the engine revolution rate N at the sampling processing of the intake pressure PB are stored, and if there is the revolution rate N close to the reference revolution rate Ns among these data, the flag F is immediately set at 1, and the present routine is terminated. In the case where there is no data of the revolution rate N close to the reference revolution rate Ns even if all data of the revolution rate N are compared with the reference revolution rate Ns, by setting the flag F at zero, the sampling processing of the intake pressure PB according to the routine shown in the flow chart of FIG. 3 is allowed.

As is apparent from the foregoing description, according to the detection and control of the intake pressure in the present example, the intake pressure Pb is sampled at every very short time, and the weighted average of the sampled values is calculated. Therefore, the pulsation of the pressure having no relation to the true quantity of air sucked in the engine can be smoothed, and no great difference is produced in the sampled intake pressure PBav. Furthermore, in the case where the sampling period is close to the pulsation period of the intake pressure PB detected by the intake pressure sensor 9 and there is a risk of generation of a long-period deflection of the sampled values, the sampling period time is changed over to a time capable of avoiding generation of a deflection of the sampled values of the sampling period. Therefore, generation of a long-period deflection in the sampled values, which cannot be coped with by the computation of the weighted average, can be prevented.

The final detected value PBav of the intake pressure PB renewed and set at every very short time period by the computation of the weighted average as mentioned above is read in a fuel supply quantity-controlling routine not shown in the drawings, and the basic fuel injection quantity Tp is computed based on the final detected value PBav and the engine revolution number N. Various correction factors are set based on the cooling water temperature Tw detected by the water temperature sensor 12 and the like, and the feedback correction factor for bringing the air-fuel ratio of the air-fuel mixture sucked into the engine, detected through the oxygen concentration in the exhaust gas detected by the oxygen sensor 14, close to the target air-fuel ratio is set. By using these factors, the basic fuel injection quantity Tp is corrected and the final fuel injection quantity Ti is computed.

At the predetermined timing of initiation of the injection of the fuel, an injection pulse signal corresponding to the newest computed value of the fuel injection quantity Ti is put out to the fuel injection valve 10 and the fuel injection valve 10 is opened for a time corresponding to the fuel injection quantity Ti, whereby the fuel is intermittently injected and supplied to the engine 1.

If the sampling processing of the intake pressure PB is carried out as in the present example, the deflection of the air-fuel ratio or the generation of a large difference of the air-fuel ratio by the pulsation of the intake pressure by suction and exhaust can be avoided, and the long-period change of the air-fuel ratio caused under the influence of the long-period deflection owing to the alignment between the sampling period and the pulsation period of the intake pressure PB can be avoided.

Incidentally, in the above-mentioned example, two routines shown in FIGS. 3 and 4 are arranged for the sampling processing of the intake pressure PB, the working period of one routine is fixed, and in the case where a trouble is generated by the alignment with the pulsation period of the intake pressure in the routine (FIG. 3) conducted at the fixed period, the sampling processing of the intake pressure PB is performed in the other routine (FIG. 4) where the working period is variably controlled according to the engine revolution number N. However, there can be adopted a modification in which a plurality of sampling routines differing in the fixed period are arranged and when the sampling period is in alignment with the pulsation period of the intake pressure PB in a certain routine, the sampling and processing of the intake pressure PB is performed in another routine which is operated at a different sampling period. Furthermore, there can be adopted a modification in which only one routine is arranged for the sampling processing of the intake pressure PB and the working period of this routine, that is, the sampling period, is variably set.

We claim:

1. A method for detecting an intake pressure in an internal combustion engine which comprises detecting the intake pressure in the engine and at least one of engine driving condition, variably setting a sampling period of the intake pressure to a sampling period, according to the engine driving condition, which is substantially different from a pulsation period of the intake pressure and, sampling and processing the intake pressure according to the sampling period set to set the value obtained by the sampling processing as a final detected value of the intake pressure.

2. A method for detecting an intake pressure in an internal combustion engine as set forth in claim 1, wherein the period different from the intake pulsation period is a period different from a product of the intake pulsation period multiplied by n and the product of the intake pulsation period multiplied by 1/n, wherein n represents an integer.

3. A method for detecting an intake pressure in an internal combustion engine as set forth in claim 1, wherein the sampling period of the intake pressure is variably and continuously set to a period which is changed according to the engine driving condition.

4. A method for detecting an intake pressure in an internal combustion engine as set forth in claim 1, wherein the sampling period of the intake pressure is selectively set to one of a plurality of periods which are different from each other according to the engine driving condition.

5. A method for detecting an intake pressure in an internal combustion engine as set forth in claim 1, wherein the engine driving condition is a revolution rate of the engine.

6. An apparatus for detecting the intake pressure in an internal combustion engine, which comprises intake pressure-detecting means disposed at an intake path of the engine to detect the intake pressure in the engine, engine driving condition-detecting means for detecting an engine driving condition, sampling period variable setting means for variably setting the sampling period of the intake pressure to a period which is substantially different from an intake pulsation period according to the engine driving condition detected by the engine driving condition-detecting means, and intake pressure sampling means which is operated according the sampling period set by the sampling period variable setting means to effect sampling and processing of the intake pressure detected by the intake pressure-detecting means and to set the value obtained by the sampled processing as the final detected value of the intake pressure.

7. An apparatus for detecting the intake pressure in an internal combustion engine as set forth in claim 6, wherein the engine driving condition detected by the engine driving condition-detecting means is the revolution rate of the engine.

8. An apparatus for detecting the intake pressure in an internal combustion engine as set forth in claim 6, wherein the sampling period of the intake pressure is variably and continuously set to a period which is changed according to the engine driving condition.

9. An apparatus for detecting the intake pressure in an internal combustion engine as set forth in claim 6, wherein the sampling period variable setting means comprises means for variably setting the sampling period of the intake pressure to a period which is variable according to the engine driving condition.

10. An apparatus for detecting the intake prresure in an internal combustion engine as set forth in claim 6, wherein the sampling period setting means comprises means for selectively setting the sampling period of the intake pressure to one of a plurality of periods which are different from each other according to the engine driving condition.

11. An apparatus for detecting the intake pressure in an internal combustion engine as set forth in claim 6, wherein the sampling period setting means comprises means for retrieving and determining the sampling period from a preset map based on the engine revolution rate.

12. An apparatus for detecting the intake pressure in an internal combustion engine as set forth in claim 6, wherein the intake pressure sampling means comprises means for calculating a weighted average of the intake pressures sampled at every sampling period, thereby obtaining the final detected value of the intake pressure.

13. An apparatus for detecting the intake pressure in an internal combustion engine as set forth in claim 6, wherein the intake pressure sampling means comprises a plurality of sampling and processing means which are operated at different periods to effect sampling and processing of the intake pressure detected by the intake pressure-detecting means and to set the final detected value, and sampling and processing-selecting means for selecting only the sampling and processing means, which is operated at the period corresponding to the set sampling period, among the plurality of the sampling and processing means and causing only the selected sampling and processing means to perform the sample processing of the intake pressure.

14. An apparatus for detecting the intake pressure in an internal combustion engine as set forth in claim 13, wherein each of the plurality of said sampling and processing means is operated at a respectively different and fixed sampling period.

15. An apparatus for detecting the intake pressure in an internal combustion engine as set forth in claim 13, which further comprises processing working period variable controling means for variably controlling the working period of at least one of the plurality of the sampling processing means according to the set sampling period.

* * * * *